No. 608,292. Patented Aug. 2, 1898.
G. KITZELMAN.
WHEEL.
(Application filed Aug. 12, 1897.)
(No Model.)
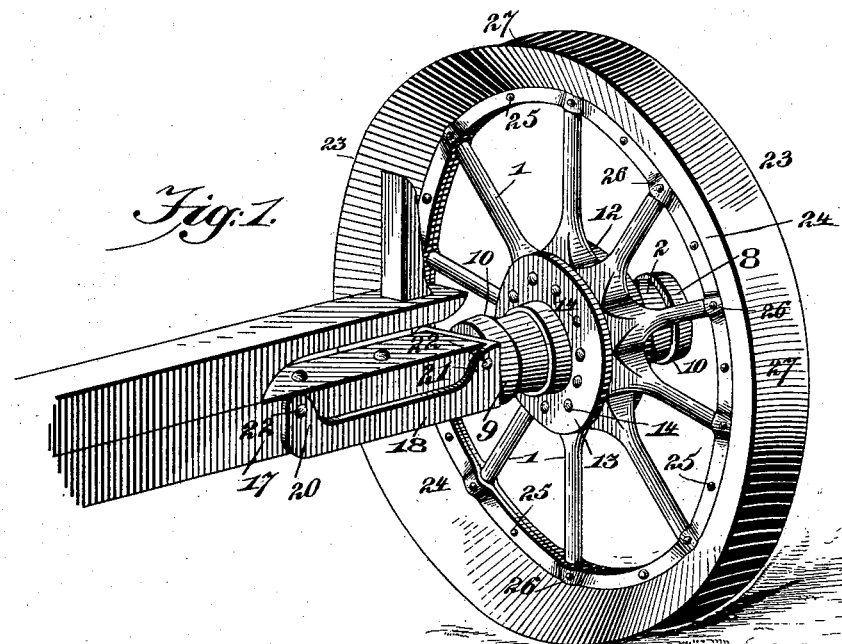
Fig. 1.
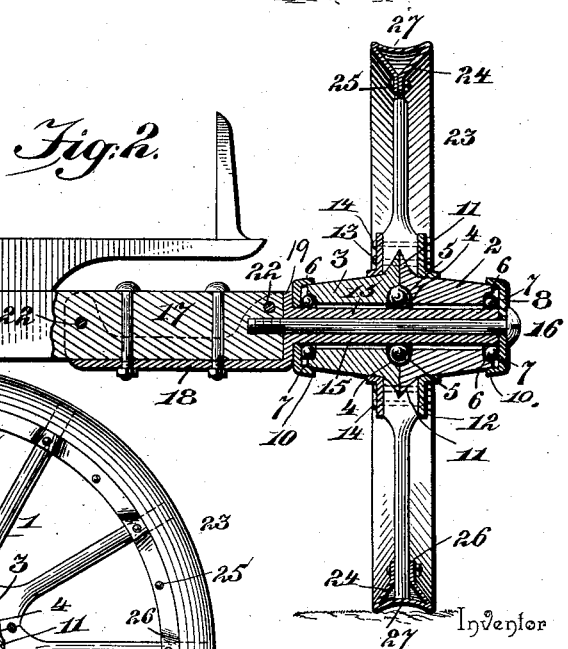
Fig. 2.
Fig. 3.
Witnesses
H. S. Dieterich
Inventor
Gustave Kitzelman
By his Attorneys,
C. A. Snow & Co.

UNITED STATES PATENT OFFICE.

GUSTAVE KITZELMAN, OF CHICAGO, ILLINOIS.

WHEEL.

SPECIFICATION forming part of Letters Patent No. 608,292, dated August 2, 1898.

Application filed August 12, 1897. Serial No. 647,985. (No model.)

*To all whom it may concern:*

Be it known that I, GUSTAVE KITZELMAN, a citizen of the United States, residing at Chicago, in the county of Cook and State of Illinois, have invented a new and useful Wheel, of which the following is a specification.

My invention relates to vehicle-wheels, and has for its object to provide a strong and durable construction of skein and means for attachment to a stub-axle, whereby the device embodying my invention may be applied as an attachment to an ordinary axle after the removal of the integral spindle, and, furthermore, to provide simple and efficient antifriction-bearing devices in connection with a wheel construction designed to increase the strength and reduce the cost of maintenance of vehicles.

Further objects and advantages of this invention will appear in the following description, and the novel features thereof will be particularly pointed out in the appended claims.

In the drawings, Figure 1 is a perspective view of a wheel constructed in accordance with my invention, the same being shown in operative relation with a vehicle-axle. Fig. 2 is a central sectional view of the same. Fig. 3 is a side view of a portion of a wheel, partly in section, in the plane of the spokes.

Similar numerals of reference indicate corresponding parts in all the figures of the drawings.

The hub of the wheel embodying my invention is of sectional construction, the same being divided transversely in the plane of the spokes 1 to form inner and outer sections 2 and 3, and an antifriction ball or roller seat 4 is formed in the meeting edges of said sections to receive the main or bearing rollers 5. Similar antifriction ball or roller seats 6 are formed in the remote extremities of the sections for the reception of auxiliary or steadying rollers 7, held in place by cap-plates 8 and 9, which are located, respectively, contiguous to the outer and inner ends of the hub. These caps are preferably flanged, as shown at 10, to overlap the contiguous extremities of the hub, and thereby exclude dust.

The hub is provided in the plane of the joint, between its inner and outer sections, with a cross-sectionally-wedge-shaped rib or circumferential enlargement, and the spokes are provided at their inner transversely-widened extremities with V-shaped notches 11 to span said joint and fit the circumferential enlargement, and hence assist in holding the sections of the hub in operative relation. The inner ends of the spokes are arranged between spaced collars 12 and 13, fitted, respectively, upon the hub-sections and connected by bolts 14, which are arranged between the planes of the spokes.

The main or bearing balls or rollers, which are located in the plane of the spokes, are of larger diameter than the auxiliary or steadying balls or rollers, which are located at the extremities of the hub, and are designed to bear the weight of the vehicle, except when lateral strain is applied to the wheel, and hence said main balls or rollers are arranged to project into the bearing-bore of the hub slightly farther than the auxiliary rolls, as will be seen by reference to Fig. 2, wherein the auxiliary rollers are allowed more play than the main rollers and are thereby relieved of pressure when the wheel is in a perfectly upright or perpendicular position.

The hub is secured upon the skein 15 by means of a bolt or screw 16, which in the construction illustrated extends axially through the skein (the latter being tubular for this purpose) and engages a socket in the end of the axle 17. This construction is adopted when the skein is constructed separately from the axle and is designed to serve as a means for steadying the skein. Other fastening devices for the skein are employed, including a clamp 18, with which the skein is preferably integral, and this clamp is provided with an outer or face plate 19 to bear against the end of the axle and upstanding inner and outer ears 20 and 21, which are bolted, as shown at 22, to the axle. The hub-securing screw passes through the base-plate of the clamp to engage the socket in the end of the axle, as shown in Fig. 2.

The rim 23 of the improved wheel is constructed of metal and preferably comprises a tire and felly which are integrally constructed of a single continuous strip of metal folded upon itself at opposite sides of and parallel with its longitudinal center to form inwardly-convergent side walls 24, secured together at their edges by transverse bolts 25 and separated at intervals to form spoke-sockets 26 for the reception of the outer extremities of the spokes, the exterior or peripheral portion of the rim forming the tread 27, which may be transversely concaved, as shown in the drawings, to enable the wheel to traverse soft soil without sinking objectionably thereinto. The improved construction of wheel therefore embodies a hollow rim which is formed of a continuous strip of metal with its side edges bent inwardly from the plane of the tread to form inclined or beveled walls which allow mud and dirt reaching the inner surface of the rim to fall off. In other words, said inclined walls form no lodgment for loose substances on the surface traversed by the wheel.

Various changes in the form, proportion, and the minor details of construction may be resorted to without departing from the spirit or sacrificing any of the advantages of this invention.

Having described my invention, what I claim is—

1. A wheel having a sectional hub and provided in the meeting edges of its sections with an antifriction-bearing-roller seat, and spokes having means for engaging and holding the hub-sections in operative relation, substantially as specified.

2. A wheel having a sectional hub divided in a plane transverse to its axis, the hub-sections being provided in their meeting edges with an antifriction-bearing-roller seat, and spokes arranged at their inner ends to span the joint between the hub-sections and engaging the contiguous extremities thereof, substantially as specified.

3. A wheel having a sectional hub divided in a plane perpendicular to its axis and provided with a circumferential cross-sectionally V-shaped enlargement contiguous to said joint, the hub-sections having in their meeting ends a bearing-roller seat, and spokes provided at their inner ends with notches to engage the circumferential enlargement of the hub, substantially as specified.

4. A wheel having its hub provided in the plane of the spokes with an annular series of bearing-rollers, and upon opposite sides of the plane of its spokes with annular series of auxiliary bearing-rollers of less diameter than the seats in which they are fitted, to allow a limited rocking movement of the hub in the plane of its axis, substantially as specified.

5. A wheel provided in the plane of its spokes with a series of main bearing-rollers and upon opposite sides of the plane of its spokes with series of auxiliary or steadying rollers of smaller diameter than the bearing-rollers, said auxiliary rollers being fitted loosely in seats which are of greater diameter than the rollers whereby the main or intermediate bearing-rollers, only, are in operation when the wheel is in its upright or normal position, substantially as specified.

6. The combination of a tubular axle-skein provided at its inner end with a cap, a hub provided at its extremities with antifriction-roller seats, the seat at the inner end of the hub being closed by said inner cap, an outer cap closing the seat at the outer end of the hub, and a screw or bolt extending through the bore of the skein and engaging the extremity of the axle, substantially as specified.

7. An axle-skein provided at its inner end with a clamp for engaging an axle, and means for securing the same to the axle, the skein being provided with an axial bore, a wheel having its hub mounted upon said skein, a removable cap covering the outer ends of the hub and skein and a screw or bolt extending through the cap and the bore of the skein and engaging a socket in the contiguous extremity of the axle to secure the cap in place and steady the skein, substantially as specified.

In testimony that I claim the foregoing as my own I have hereto affixed my signature in the presence of two witnesses.

G. KITZELMAN.

Witnesses:
  H. HOPPIE,
  F. HOPPIE.